United States Patent [19]
Park

[11] Patent Number: 5,898,649
[45] Date of Patent: Apr. 27, 1999

[54] METHOD AND APPARATUS FOR DISK ROULETTE CONTROL FOR USE IN AN OPTICAL DISK CHANGER

[75] Inventor: Dong-Kyun Park, Seoul, Rep. of Korea

[73] Assignee: Daewoo Electronics Co., Ltd., Seoul, Rep. of Korea

[21] Appl. No.: 08/931,446

[22] Filed: Sep. 16, 1997

[30] Foreign Application Priority Data

Dec. 31, 1996 [KR] Rep. of Korea .................. 96-81015

[51] Int. Cl.⁶ ................................................ G11B 17/22
[52] U.S. Cl. .............................................. 369/34; 369/36
[58] Field of Search .................................. 369/34, 36, 38, 369/37, 75.2, 30, 75.1, 39, 32, 33, 179; 360/98.04, 98.06

[56] References Cited

U.S. PATENT DOCUMENTS

| | | | |
|---|---|---|---|
| 5,132,949 | 7/1992 | Choi ........................................... | 369/37 |
| 5,193,079 | 3/1993 | Ko et al. ..................................... | 369/37 |
| 5,293,362 | 3/1994 | Sakurai et al. ............................. | 369/30 |
| 5,528,567 | 6/1996 | Kim ............................................ | 369/37 |
| 5,631,884 | 5/1997 | Chun .......................................... | 369/37 |
| 5,734,630 | 3/1998 | Nishigori et al. .......................... | 369/36 |

*Primary Examiner*—Ali Neyzari

[57] ABSTRACT

Rotation of a tray roulette for use in a disk changer is controlled by using disk ID codes, a start code and an end code, each code being produced while a scanner electrode contacts ID electrodes, start electrodes and end electrodes as the tray roulette rotates; specifically, the method generates fixed voltages while the scanner electrode contacts the ID electrodes, the start electrodes and the end electrodes; produces the ID codes, the start code and the end code by converting the fixed voltages received from the ID electrodes, the start electrodes and the end electrodes; and controls the rotation of the tray roulette by using the ID codes in order to rotate and stop the tray roulette at a pickup position.

8 Claims, 10 Drawing Sheets

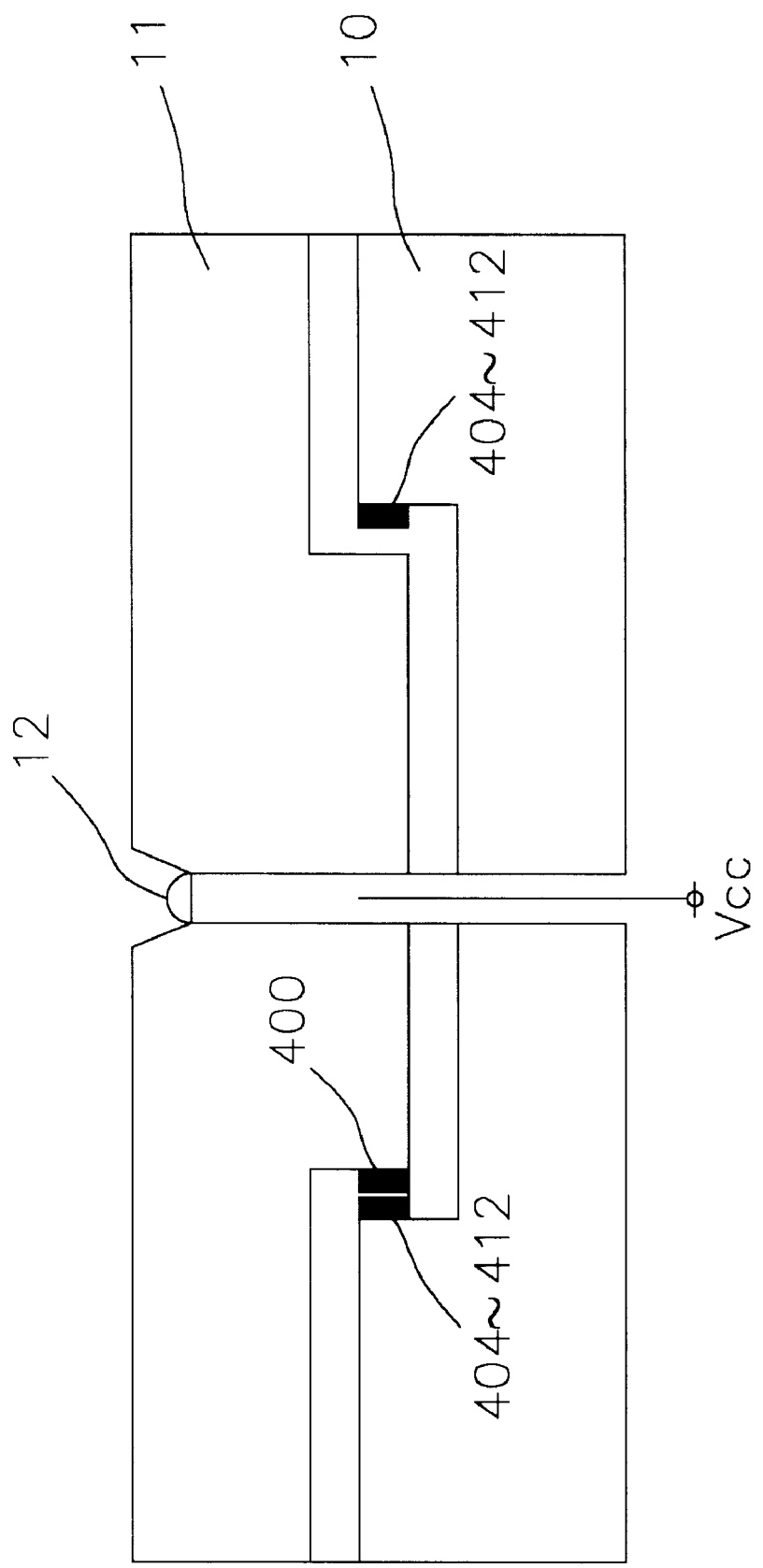

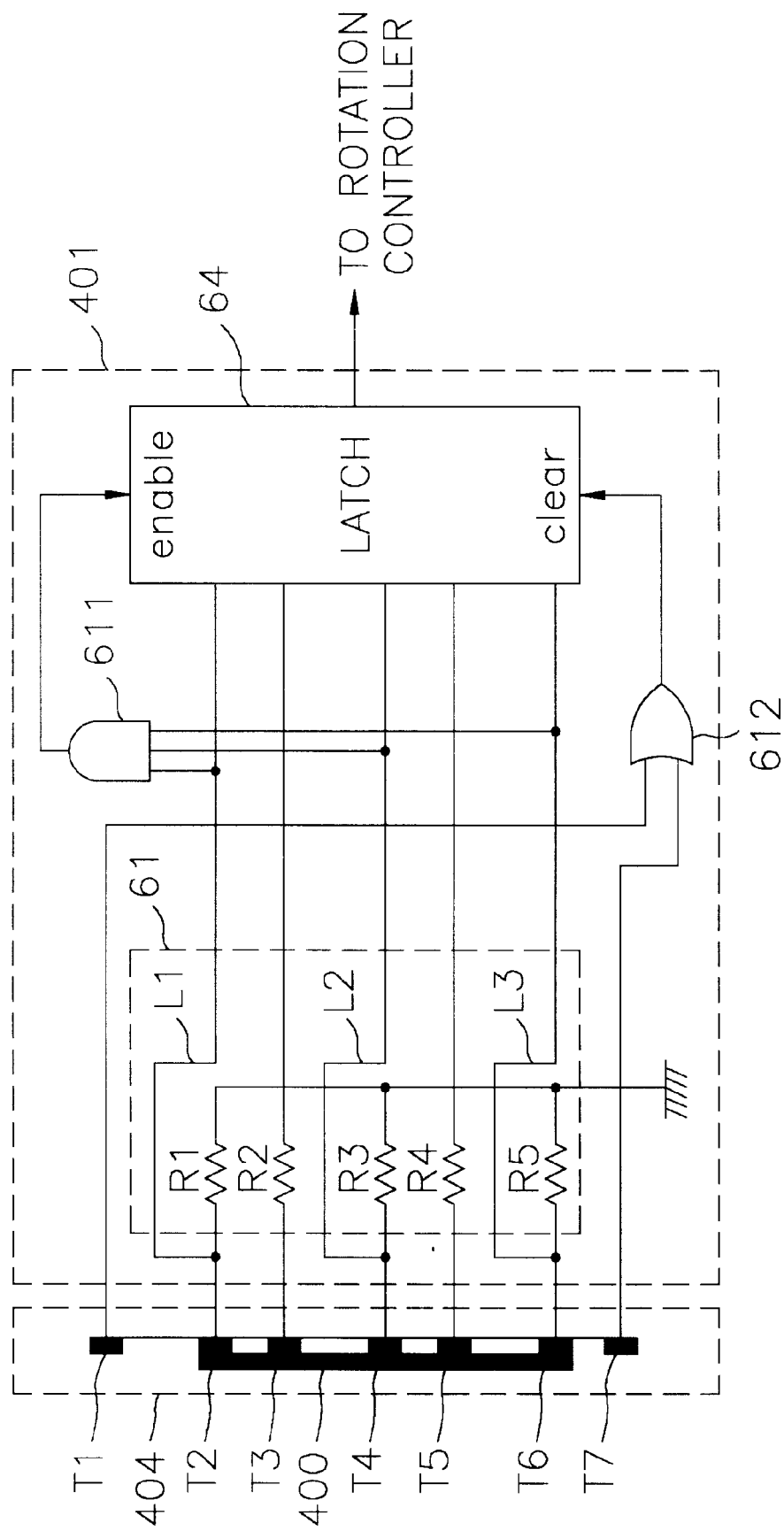

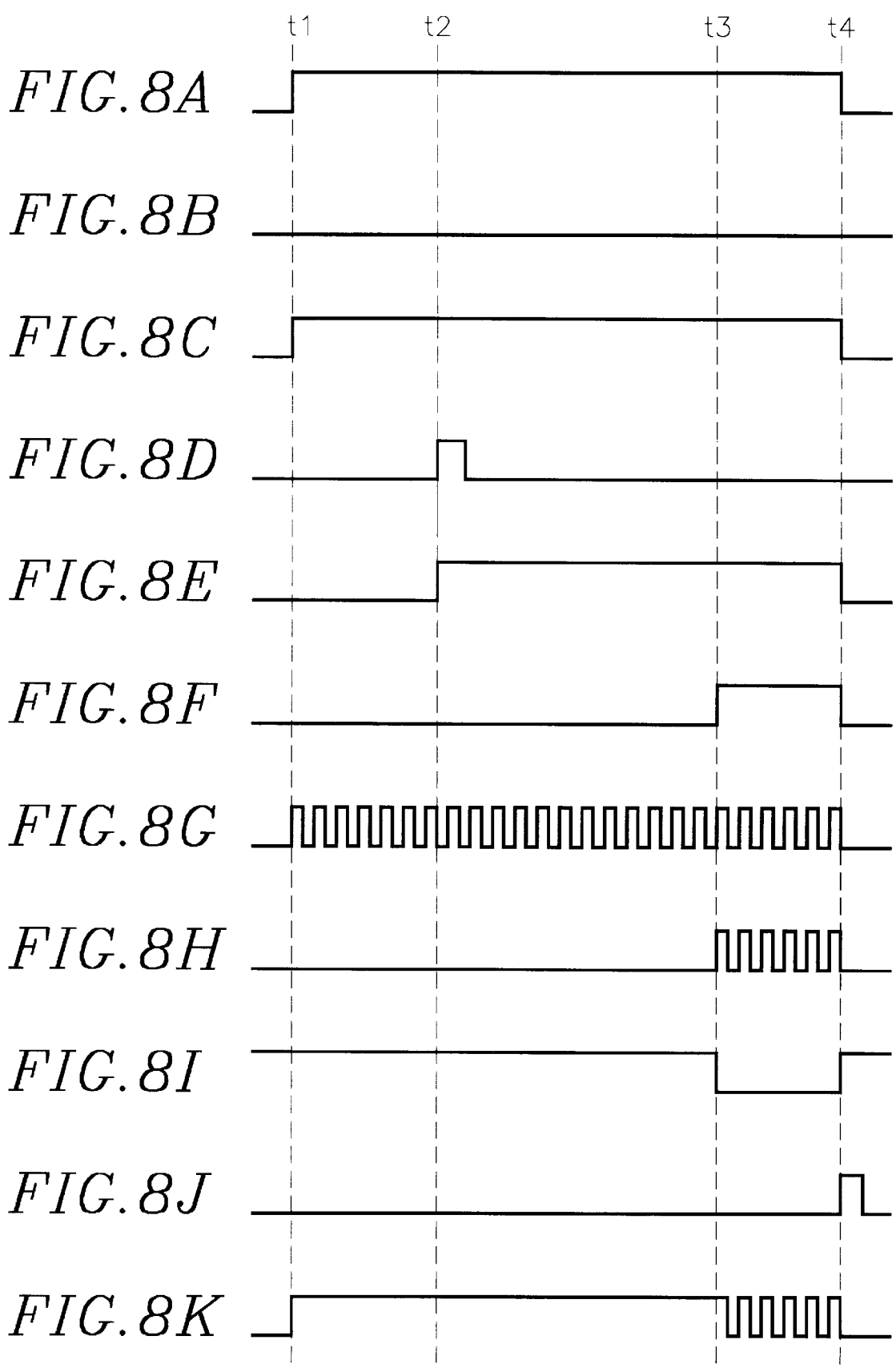

METHOD AND APPARATUS FOR DISK ROULETTE CONTROL FOR USE IN AN OPTICAL DISK CHANGER

FIELD OF THE INVENTION

The present invention relates to an optical disk changer; and, more particularly, to a tray roulette control apparatus for use in selecting a target dish by controlling the rotation of the tray roulette.

BACKGROUND OF THE INVENTION

A conventional optical disk player, which reproduces video and/or audio signals recorded on an optical disk and outputs them through a display and/or a speaker, includes a CDP(Compact Disk Player), an LDP(Laser Disk Player), a CDGP(Compact Disk Graphic Player) and the like. The CDP is typically an apparatus capable of reproducing audio signals only; and both the LDP and the CDGP are apparatus capable of reproducing video as well as audio signals simultaneously. A VCDP(Video Compact Disk Player) is also capable of reproducing both video and audio signals.

These disk players are becoming more and more popular because of their high-performance characteristics, e.g., high S/N ratio, low noise, little distortion and no ghost.

In some applications such as a motion picture film, however, the amount of data, e.g., a whole volume of data of the motion picture film, is too large to be stored on a single disk and the data has to be divided onto several disks. A disk changer can be employed to load a plurality of disks on a tray roulette thereof to reproduce the data off the plurality of disks sequentially or selectively in response to a user's instructions.

Referring to FIG. 1, there is illustrated a typical tray roulette of the disk changer capable of loading three disks at a time.

The disk changer, as shown, comprises a base 10 to support a tray roulette 11 having three dishes 14 to 16 to cradle disks loaded therein, e.g., three disks 17, 18, 19, one disk in one dish, a spindle 12 around which the tray roulette 11 rotates, a sensor 13 which is attached to the base 10 and identifies each dish and generates a code for each dish.

A unique ID(identification) code is assigned to each of the dishes 14 to 16, e.g., ID1, ID2, ID3, respectively. A target dish may be easily sorted out by using these ID codes, wherein the target dish is the one that holds the disk the user selects among the disks loaded on the tray roulette for reproducing the data recorded thereon. The sensor 13, located at a position on a line making a preset angle counterclockwise with a radial line crossing a pickup position Y, is used in sensing the ID codes, wherein the pickup position is a position where the data on the target dish is reproduced, i.e., where an optical pickup device is located to catch the data read from the target dish.

For the optical pickup device at the pickup position Y to read data from the target dish, the tray roulette revolves around its spindle 12. During the rotation, the sensor 13 checks the ID of the dish passing it by generating pulse signals representing the ID of each dish to be identified.

Turning to FIG. 2, there is illustrated a conventional tray roulette controller.

The tray roulette 11 is revolved around its spindle by a motor driver 22 which drives the motor 23 by providing appropriate power to the motor 23 under the control of a micom 21, wherein the micom is a signal processing device including a microprocessor and basic peripherals such as ROM, RAM, I/O device, etc.

As is shown in FIG. 3, while the tray roulette 11 rotates, the sensor 13 generates a single pulse A for a first dish 14, two pulses B for a second dish 15 and three pulses C for a third dish 16. The micom 21 identifies each dish by counting the number of pulses coming from the sensor 13.

Also shown in FIG. 3 is a start/end pulse signal, which consists of four consecutive pulses between each ID pulse groups A, B and C. The start/end pulse signal is used for controlling the rotation of the tray roulette 11. A set of two pulses out of the four pulses is referred to as a start code S, and another set of the two remaining pulses is called an end code E.

To check the ID of the target dish while the tray roulette rotates clockwise, the micom 21 counts the number of pulses emerging after the start code S.

Upon detection of the end code E that follows an ID code pulses, the tray roulette 11 stops rotating for the target dish to be positioned exactly at the pickup position Y.

For example, the target dish is the dish 15 whose ID is ID2. If two pulses are detected after the detection of the start code S, the ID of the dish currently approaching the pickup position Y is identified as ID2. Immediately after the detection of the end code E following the pulses for the ID2, the rotation of the tray roulette 11 is stopped. The dish whose ID is ID2, i.e., the dish 15, will be positioned for the pickup position Y.

Moreover, for the purpose of easy detection, the pulses are designed such that the pulse width of the start/end pulses and that of the ID pulses are designed to be different from each other. When the tray roulette 11 rotates at its normal speed, the pulse width of the ID pulse is, e.g., 20 msec; that of the start/end pulse is, e.g., 60 msec; and the interval between the ID pulse and the start/end pulse is maintained high, e.g., at 350 msec. Therefore, merely by checking the pulse width, it is possible to determine whether a detected pulse is the start/end pulse or the ID pulse.

Upon receiving a user's instructions to search for a target dish, the micom 21 gets the ID of the target dish, and compares the ID of the target dish with the ID of the dish currently positioned at the pickup position Y. If the result of the comparison is not equal, the micom 21 sends a drive signal to the motor driver 22 to rotate the motor 23. Once the tray roulette 11 rotates, the micom 21 detects at first the start code from the sensor 13, and then receives the ID pulse. While the tray roulette keeps rotating, it detects a falling edge of the first pulse which is the starting point of the end pulse E. Upon detecting the falling edge, it outputs a PWM(Pulse Width Modulation) signal having a predetermined duty ratio for use in reducing the rotation speed of the motor 23 to the motor driver 22, wherein the PWM signal consists of a string of consecutive pulses whose duty ratio varies.

Then, when the micom 21 detects a rising edge of the second pulse, indicating ending of the end pulse E, it outputs a reverse-polarity one-shot pulse to the motor driver 22, thus forcing the tray roulette to stop rotating, wherein the reverse-polarity one-shot pulse is used for stopping the rotation of the motor 23 to generate a torque whose direction is opposite that of the rotation.

To control the tray roulette in accordance with the conventional disk player, however, the micom 21, on the basis of the received codes from the sensor 13, identifies the received codes by counting the number of pulses in the received codes and checking the duty ratio of the pulses, compares the received codes with the code of the target dish inputted by the user, and provides the drive signal and the reverse-polarity one-shot pulse to the motor drive 22, and the like. Therefore, it is rather time consuming to go through the whole processes, which after results in a rather long search time in seeking the target dish.

SUMMARY OF THE INVENTION

It is, therefore, a primary object of the present invention to provide a disk changer which is capable of providing a fast rotation control for a tray roulette, to thereby reduce the process volume of the microprocessor that controls the rotation of the tray roulette In accordance with the present invention, there is provided a method for controlling a rotation of a tray roulette for use in a disk changer, the tray roulette having a plurality of dishes and each dish cradling a disk, the method comprising the steps of: (a) receiving a user's instructions to search for a target dish out of the plurality of dishes in the tray roulette; (b) rotating the tray roulette in response to the user's instructions; (c) producing a plurality of ID codes for identifying the plurality of dishes, a start code and an end code while a scanner electrode contacts ID electrodes, start electrodes and end electrodes linked to the tray roulette as the tray roulette rotates; and (d) controlling the rotation of the tray roulette by using the ID codes, the start code and the end code.

There is also provided an apparatus for controlling a tray roulette, the tray roulette having a plurality of dishes, each dish cradling a disk, for use in a disk changer, wherein the apparatus generates a plurality of ID codes for identifying the dishes, respectively, and a start code and an end code for use in searching a target dish, the apparatus comprising: a control means for outputting the ID code assigned to the target dish and generating a drive signal for use in determining the rotation and direction of the tray roulette once the target dish is determined; a comparing means for comparing the ID codes generated during the rotation of the tray roulette with the ID code of the target dish provided by the control means; a stop control means for generating a selection signal for use in selecting one out of the drive signal, a PWM signal and a reverse-polarity one-shot pulse; a PWM means for providing the PWM signal for use in reducing the rotation speed of the tray roulette when the target dish reaches a prescribed position; a one-shot pulse generating means for providing the reverse-polarity one-shot pulse for use in stopping the tray roulette when the target dish reaches a pickup position; a multiplexer for selectively outputting either the drive signal or the PWM signal in response to the selection signal; and a driving means for driving and stopping a motor in response to the output of the one-shot pulse generating means and the output of the multiplexer.

BRIEF DESCRIPTION OF THE DRAWINGS

The above and other objects and features of the present invention will become apparent from the following description of preferred embodiments given with reference to the accompanying drawings, in which:

FIG. 5 offers a cross-sectional view of X-X' shown in FIG. 4;

FIGS. 6A, 6B and 6C depict details of the ID electrodes and ID code generators shown in FIG. 4;

FIG. 8 exemplifies pulse waveforms generated by certain units of the rotation controller.

DETAILED DESCRIPTION OF THE PREFERRED EMBODIMENTS

Figure 1:
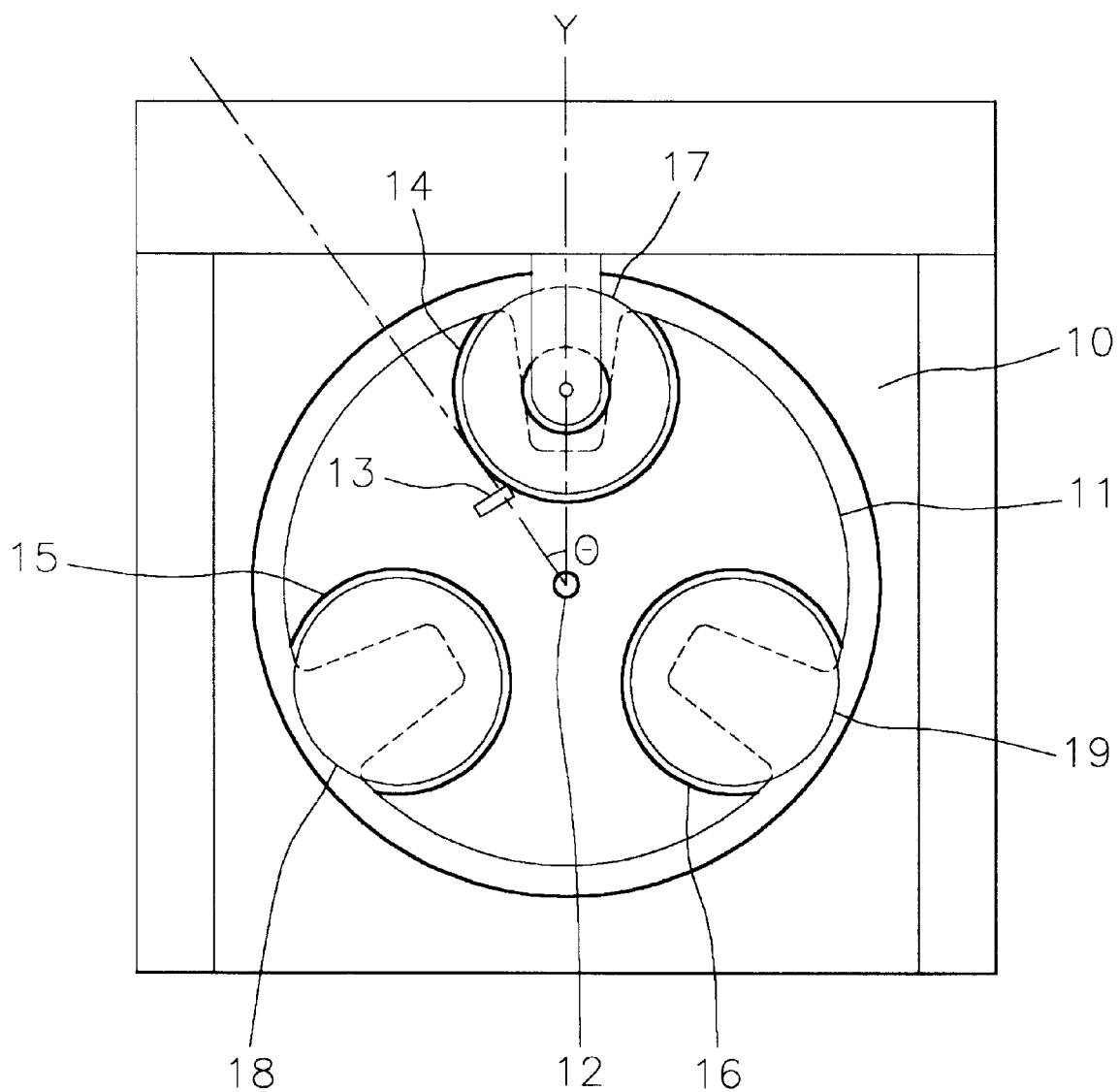
FIG. 1 illustrates a tray roulette employed in a conventional disk changer capable of loading three disks at a time.
Figure 2:
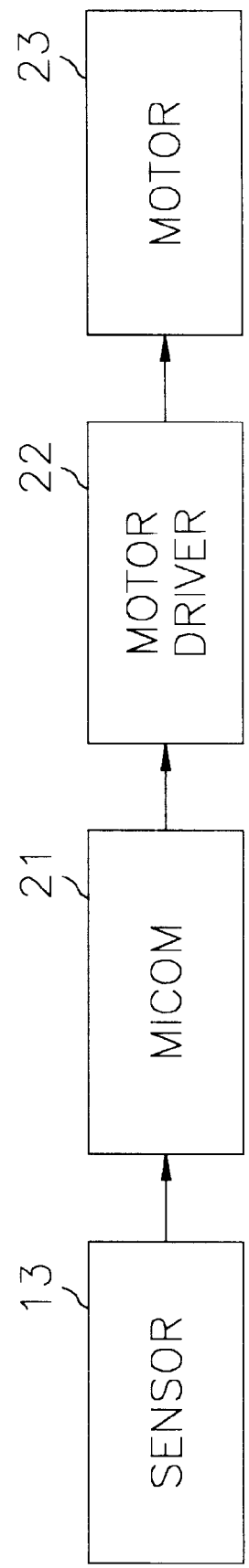
FIG. 2 describes a block diagram of a conventional tray roulette controller.
Figure 3:
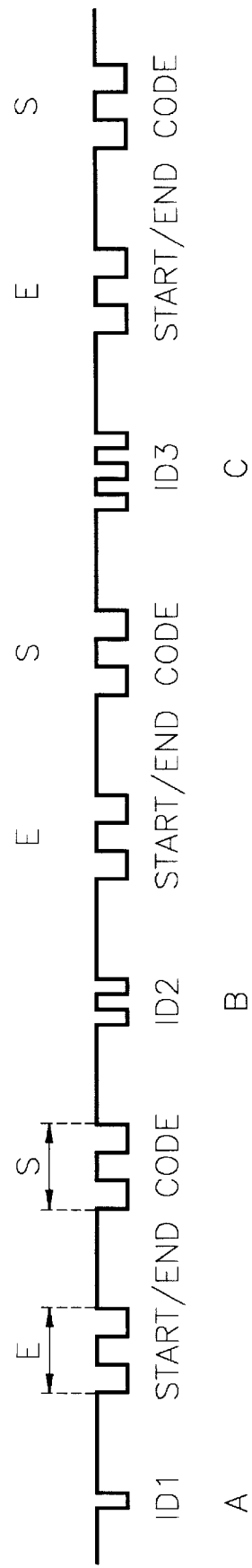
FIG. 3 shows the waveforms of the codes generated by the sensor shown in FIG. 1.
Figure 4:
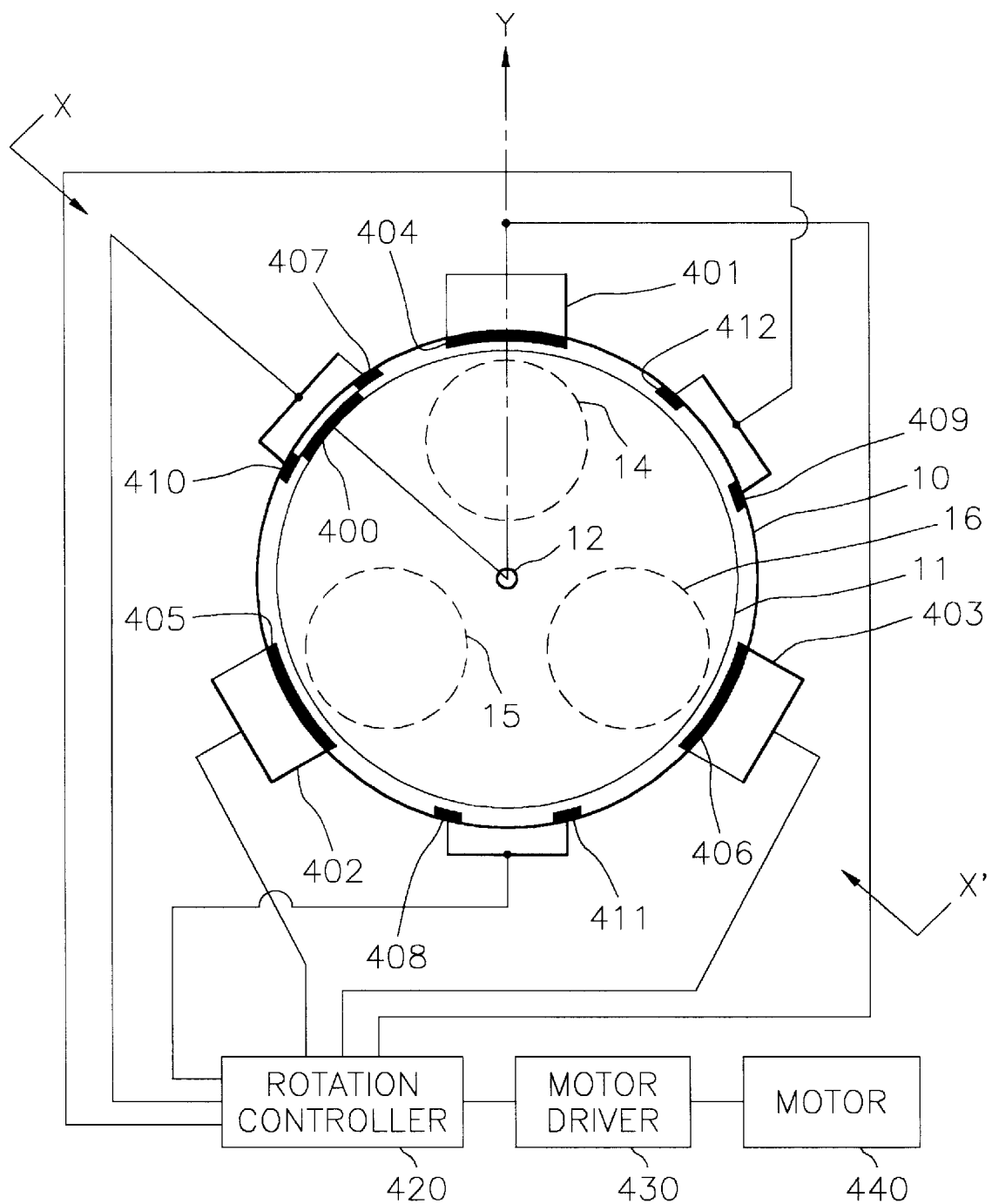
FIG. 4 presents a tray roulette controller in accordance with the present invention.

FIG. 4 illustrates a tray roulette controller which generates ID, start and end codes while the tray roulette 11 rotates, processes the ID, the start and the end codes and drives a motor associated with the tray roulette.

In FIG. 5, there is illustrated a cross-sectional view of the tray roulette shown in FIG. 4 along the line X-X'.

Referring to FIG. 4 and FIG. 5, the tray roulette controller in accordance with the present invention comprises a base 10, a tray roulette 11, a spindle 12, three dishes 14 to 16, three ID code generators 401 to 403, three ID electrodes 404 to 406, three start electrodes 407 to 409, three end electrodes 410 to 412, three ID codes, a rotation controller 420, a motor driver 430 and a motor 440.

The base 10 supports the tray roulette 11 by using a spindle 12.

The tray roulette 11 supported on the base 10, has three dishes 14 to 16, each for cradling a disk and rotates around the spindle 12 in compliance with the rotation of the motor 440.

The scanner electrode 400, attached to the side wall of the tray roulette 11, contacts the ID, the start and the end electrodes as the tray roulette 11 rotates, to provide a fixed voltage to the electrodes contacted.

The ID electrodes 404 to 406 generate ID codes of the dishes while the ID electrodes contact the scanner electrode 400, wherein each ID electrodes is located on a radial line originating at the spindle 12 of the tray roulette 11, the angle between two radial lines is 120 degrees.

Each of the ID code generators 401 to 403 receives the respective fixed voltages from the respective ID electrodes 404 to 406 and converts same to an ID code.

Each of the start electrodes 407 to 409 and each of the end electrodes contact the scanner electrode 400 and generate a start code and an end code for use in controlling the start and the halt of the motor 440 as the tray roulette 11 rotates, wherein each set of the start and the end electrodes is equally spaced from each other, each being located between the three ID electrodes 404 to 406.

The rotation controller 420 provides a signal for driving the motor to the motor driver 430.

The motor driver 430 drives the motor 440 by providing power to the motor 440 under the control of the rotation controller 420.

Figure 6B:
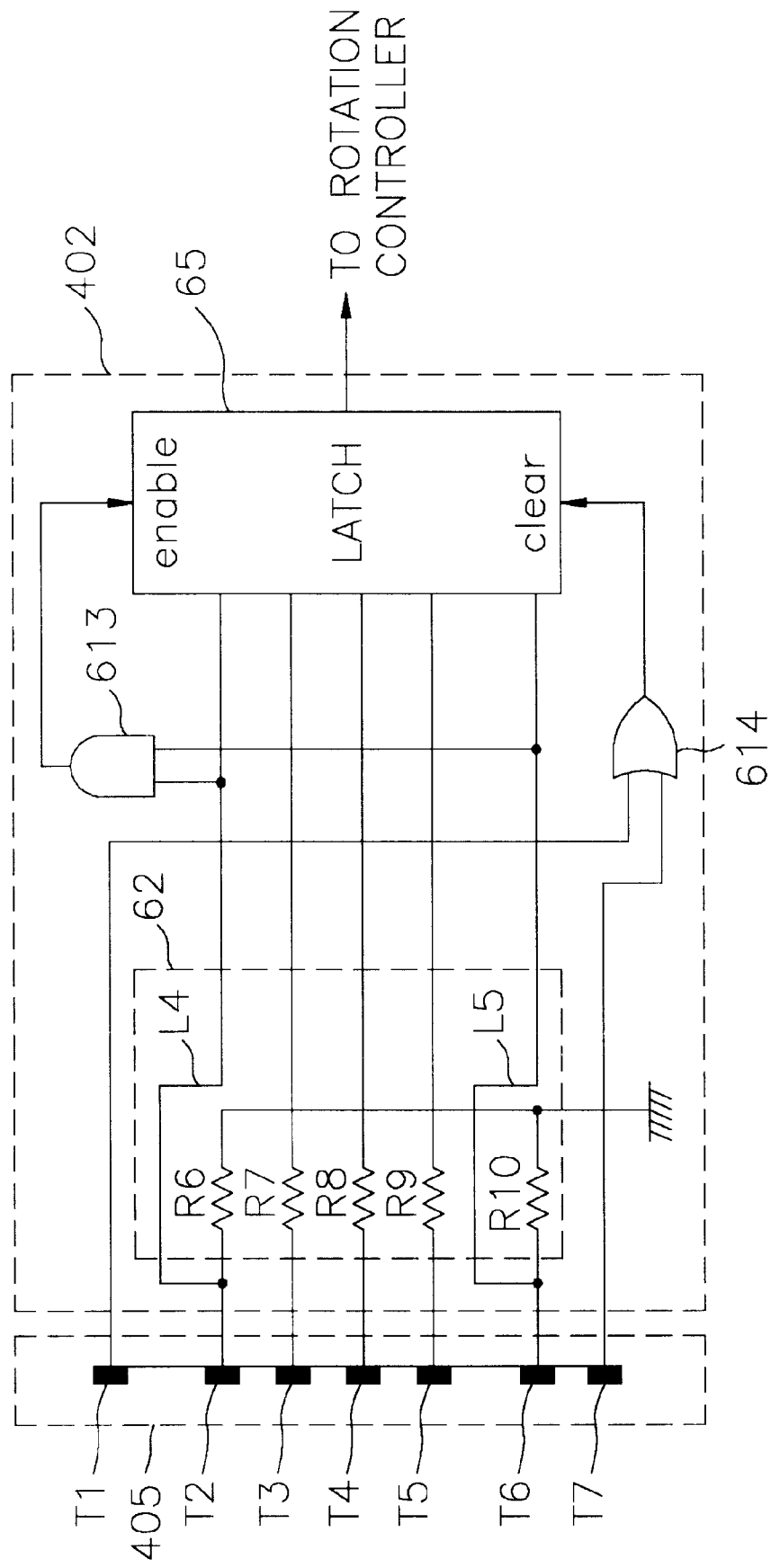
Figure 6C:
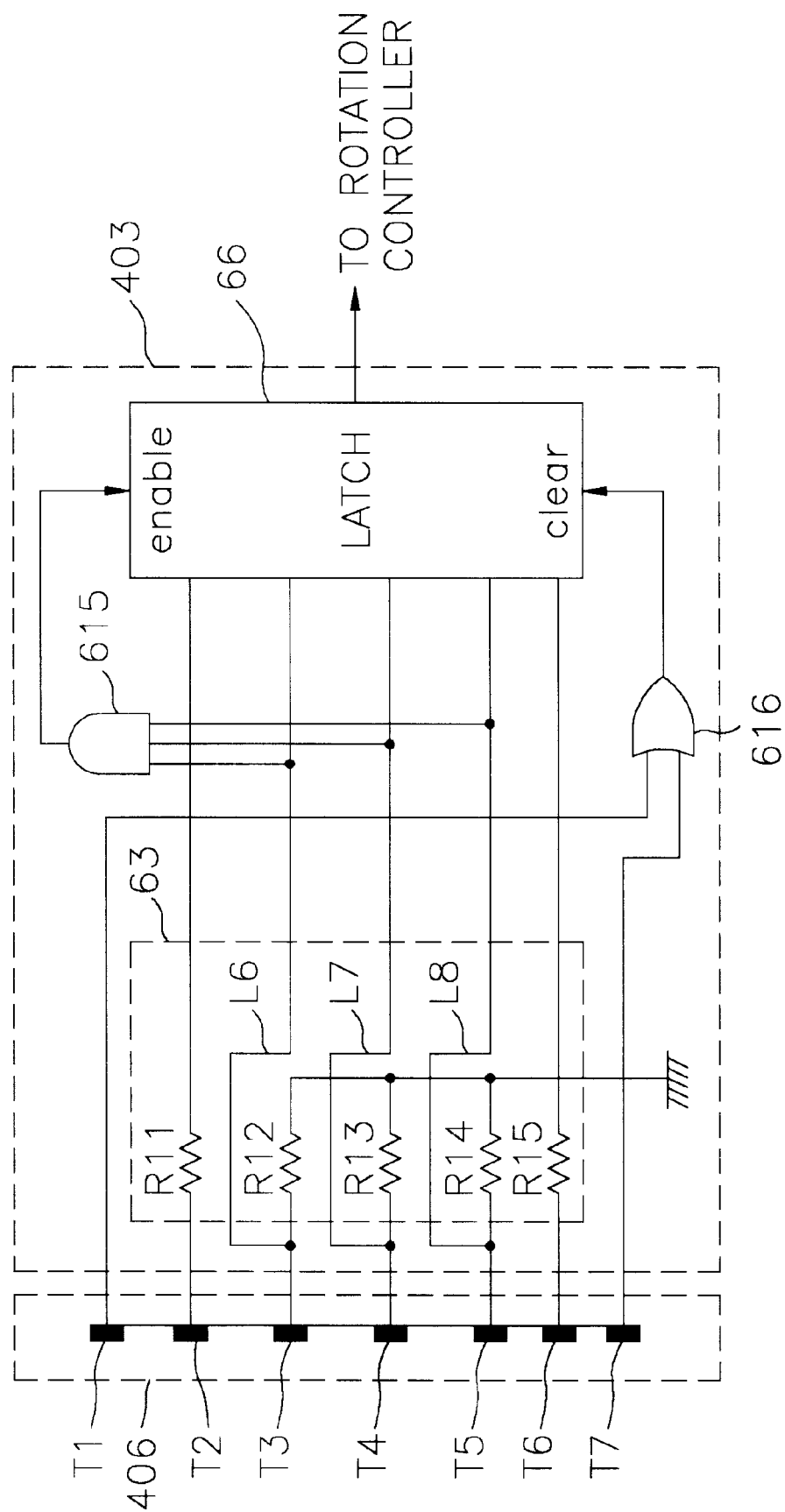

FIGS. 6A, 6B and 6C depict details of the ID electrodes 404 to 406 and the ID code generators 401 to 403 shown in FIG. 4.

Each of the ID electrodes 404 to 406 includes five code electrodes T2 to T6 and two clear electrodes T1 and T7.

The five code electrodes T2 to T6 which are attached side-by-side, equally spaced, to the side wall of the base 10, transfer the fixed voltage, e.g., 5 V, supplied from the scanner electrode 400, to a coder 61, wherein the 5 V is interpreted as a logic 1.

First clear electrodes T1's and second clear electrodes T7's make the latches 64 to 66 clear themselves when the clear electrodes make contact with the scanner electrode 400. Since the voltage of the clear electrodes T1's and T7's are fed to OR-gates 612, 614 and 616, they make the latches 64 to 66 clear themselves whenever one of the clear electrodes contacts the scanner electrode 400.

Input terminals of AND-gates 611, 613 and 615 are connected to code electrodes which may output 5 V signal to the latches 64 to 66. That means the AND-gate 611 enables the latches 64 to 66 when the scanner electrode 400 contacts the code electrodes which may output 5 V to the latches 64 to 66.

Herein the relative size and interval of the code electrodes T2 to T6 and the clear electrodes T1 and T7 are such that the scanner electrode 400 is able to contact five electrodes among the ID electrode 404 to 406 at a time.

The latches 64 to 66 hold for a time and output the unique codes stored in them.

The coders 61 to 63 transform the fixed voltages into unique codes, each being consisted of 5 bits, wherein the unique codes are associated with each of the dishes 14 to 16.

The coder 61 of the ID code generator 401 includes: a line L1 for connecting the code electrode T2 to the latch 64; a resistor R1 one end of which is connected to the code electrode T2, while the other end is grounded, a resistor R2 one end of which is connected to the code electrode T3, while the other end is to the latch 64; a line L2 connecting the code electrode T4 to the latch 64; a resistor R3 one end of which is connected to the code electrode T4, while the other end is grounded; a resistor R4 one end of which is connected to the code electrode T5, while the other end is to the latch 64; a line L3 connecting the code electrode T6 to the latch 64; and a resistor R5 one end of which is connected to the code electrode T6, while the other end is grounded.

In a similar manner, each of one ends of the resistors R6 to R10 in the ID code generator 402 is connected to the respective code electrodes T2 to T6; while each of the other ends of the resistors R7 to R9 is connected to the latch 65 and each of the other ends of R6 and R10 are to the ground, respectively. Lines L4 and L5 are connecting directly the code electrodes T2 and T6 to the latch 65, respectively.

Also in the similar manner, each of one ends of the resistors R11 to R15 in the ID code generator 403 is connected to the respective code electrodes T2 to T6; while each of the other ends of the resistors R11 and R15 is connected to the latch 66 and the other ends of R12 to R14 are to the ground, respectively. Lines L6 to L8 are connecting directly the code electrodes T3 to T5 to the latch 66, respectively.

Hereinafter, the operation of the ID electrodes 404 to 406 and the ID code generators 401 to 403 in accordance with the present invention will be described.

The scanner electrode 400 which rotates as the tray roulette revolves, contacts the ID electrodes 404 to 406, the start and the end electrodes 407 to 412; more specifically, the scanner electrode 400 also contacts, the code electrodes T2 to T6 and the clear electrodes T1 and T7.

First, the description is given on condition that the tray roulette 11 rotates clockwise.

When the scanner electrode 400 contacts the first enable electrode T1 of the ID electrode 404 in the course of the rotation of the tray roulette 11, the fixed voltage of the scanner electrode 400 is supplied to the latch 64 via the clear electrode T1 and the OR-gate 612, and as a result, the latch 64 is cleared. The latch 64 remains enabled as long as the scanner electrode 400 contacts the code electrodes T2, T4 and T6 simultaneously. When the scanner electrode 400 simultaneously contacts each of the code electrodes T2 to T6 in the course of the rotation, the coder 61 generates a code 10101. At this time, the latch 64 is enabled and outputs the code 10101 to the rotation controller 420.

As the scanner electrode advances further, the latch 64 is cleared because the scanner electrode 400 contacts the second clear electrode T7.

Eventually, the code coming out of the latch 64 is 10101.

In a similar manner by referring to FIG. 6B, the latch 65 of the ID code generator 402 produces a code 10001.

Turning to FIG. 6C, also in the same manner, the latch 66 of the ID code generator 403 generates a code 01110.

From the above description, the unique code 10101 is generated only in the ID code generator 401 not in the other ID code generators 402 and 403; the unique code 10001 is generated only in the ID code generator 402 but not in the ID code generators 401 and 403; and the unique code 01110 is generated only in the ID code generating unit 403 but not in the ID code generators 401 and 402.

Therefore, an appearance of the code 10101 indicates that the ID2 dish 15 is currently approaching the pickup position Y; generation of the code 10001 represents that the ID1 dish 14 is currently approaching the pickup position Y; and generation of the code 01110 tells that the ID3 dish 16 is currently approaching the pickup position Y.

By the subsequent rotation of the tray roulette 11 after the generation of the code 10101, in case of the ID code generator 401, it is designed so that the ID2 dish 15 finally reached the exact pickup position Y when the scanner electrode 400 reaches a position between the start electrode 409 and the end electrode 412.

Similarly, by the subsequent rotation of the tray roulette 11 after the generation of the code 10001, it is designed so that the ID1 dish 14 finally reaches the exact pickup position Y when the scanner electrode 400 reaches a position between the start electrode 407 and the end electrode 410.

Also in the same manner, by the subsequent rotation of the tray roulette 11 after the appearance of the code 01110, it is designed so that the ID3 dish 16 finally reached the exact pickup position Y when the scanner electrode 400 reaches a position between the start electrode 408 and the end electrode 411.

Second, on the contrary to the description above, when the tray roulette 11 rotates counterclockwise, the scanner electrode contacts the ID electrodes and the start electrodes and end electrodes in reverse order to the clockwise case. That means the role of the start electrode and end electrode and the enable electrode and the clear electrode must be switched, respectively. Since the start electrode and the end electrode is equal to each other, i.e., there is inherently no hierarchy and order, it doesn't matter whether the tray roulette 11 rotate clockwise or counterclockwise. Also, in case of the code electrode and the clear electrodes the direction of rotation does not matter because of the ID codes 10101, 10001 and 01110 is designed symmetrical and because the order of the contact of clear electrodes T1 and T7 makes no difference as shown in FIG. 6A, 6B and 6C.

Accordingly, an appearance of the code 10101 indicates that the ID1 dish 14 is currently approaching the pickup position Y; generation of the code 10001 represents that the ID3 dish 16 is currently approaching the pickup position Y; and generation of the code 01110 tells that the ID2 dish 15 is currently approaching the pickup position Y.

By the subsequent rotation of the tray roulette 11 after the generation of the code 10101, in case of the ID code generator 401, it is designed so that the ID1 dish 14 finally reached the exact pickup position Y when the scanner electrode 400 reaches a position between the start 407 and the end electrode 410.

Similarly, by the subsequent rotation of the tray roulette 11 after the generation of the code 10001, it is designed so that the ID3 dish 16 finally reached the exact pickup position Y when the scanner electrode 400 reaches a position between the start electrode 408 and the end electrode 411.

Also in the same manner, by the subsequent rotation of the tray roulette 11 after the appearance of the code 01110, it is designed so that the ID2 dish 15 finally reached the exact pickup position Y when the scanner electrode 400 reaches a position between the start electrode 409 and the end electrode 412.

Figure 7:
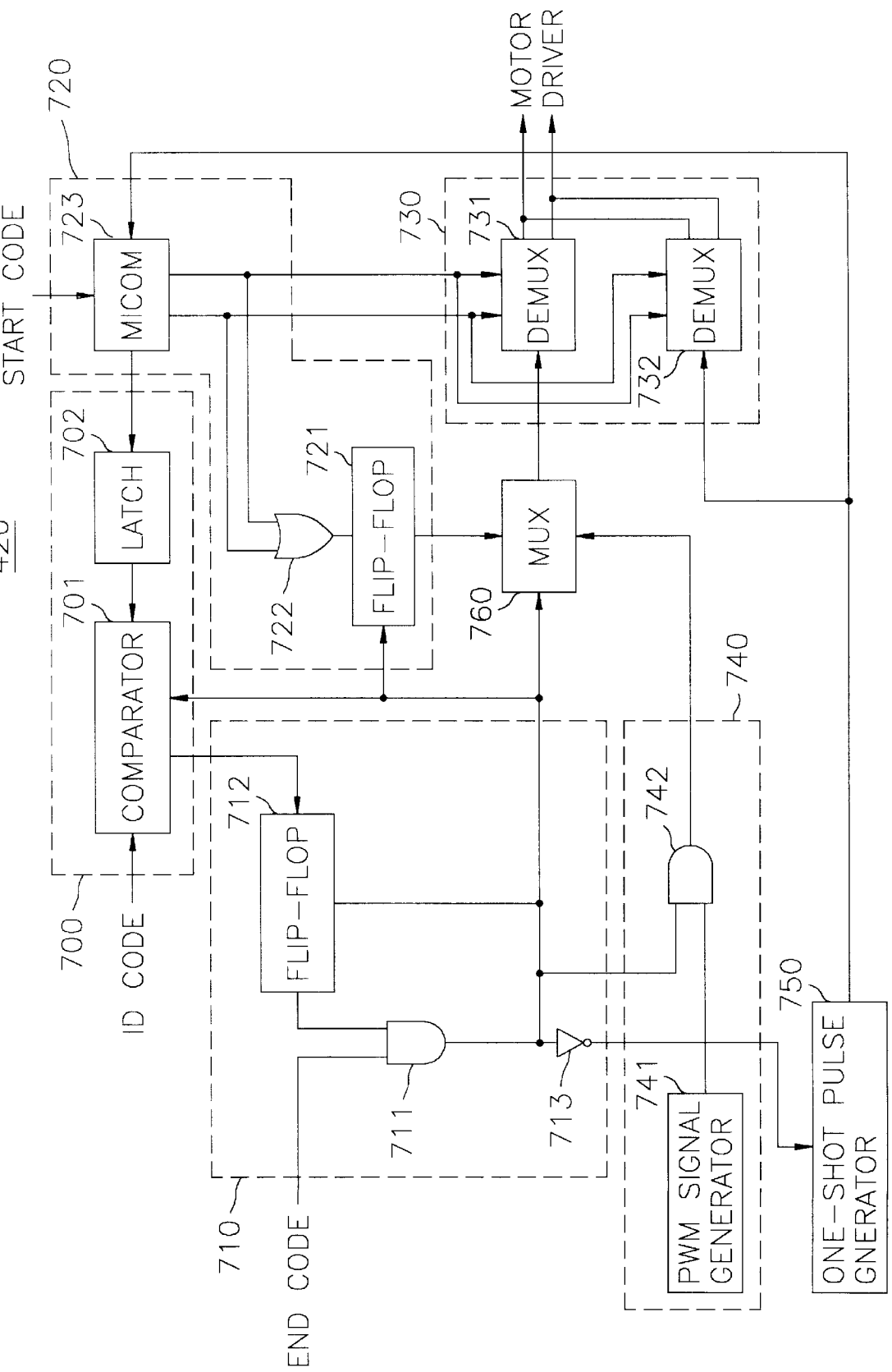
FIG. 7 provides details of the rotation controller shown in FIG. 4.

Turning to FIG. 7, there is illustrated a detailed description of a rotation controller 420 shown in FIG. 4.

The rotation controller 420 comprises a comparator block 700, a stop controller block 710, a controller block 720, a driver block 730, a PWM signal provider block 740, a one-shot pulse generator 750 and a multiplexer 760.

The comparator block 700 compares the ID code generated while the scanner electrode 400 contacts one of the ID electrodes 404 to 406 with the ID code of the target dish provided by the controller block 720.

The stop controller block 710 controls the selection operation of the multiplexer 760 and the output timing of the PWM signal and a one-shot pulse by using the end code and output of the comparator block 700.

The controller block 720 outputs the ID code of the target dish in response to a user's instructions and a drive signal for use in rotating the tray roulette and choosing a direction of the rotation of the motor 440.

The driver block 730 is for driving and stopping the motor(not shown) in response to the outputs of controller block 720, the one-shot pulse generator 750 and the multiplexer 760, so that the tray roulette can revolve according to a direction and stop at the pickup position Y.

The PWM signal provider block 740 is for providing PWM signal for use in reducing the rotation speed of the tray roulette 11 after the target dish reaches a prescribed position before the pickup position Y.

The one-shot pulse generator 750 is for providing a reverse-polarity one-shot pulse when the target dish arrives at the pickup position Y.

The multiplexer 760 is for selectively outputting the drive signal from the controller block 720 and the PWM signal from the PWM signal provider block 740.

Herein, the comparator block 700 includes a comparator 701 and a latch 702. The comparator 701 compares one of the ID code from the ID code generators 401 to 403 with the ID code of the target dish provided by the latch 702 and generates a match signal when the compared codes are identical to each other. The latch 702 holds the ID code of the target dish received from a micom 723 until the ID code from the ID code generators 401 to 403 is inputted to the comparator 701 and send the ID code of the target dish to the comparator 701.

The stop controller block 710 includes a flip-flop 712, an AND-gate 711 and an inverter 713. The flip-flop 712 keeps holding the output of the comparator 701 until a control signal is inputted thereto. The flip-flop 712 transmits the signal to the AND-gate 711. The AND-gate 711 logically multiplies the output of the flip-flop 712 and the end code, and then sends the multiplication result in order to control the PWM signal provider block 740, the multiplexer 760, the flip-flop 712 and the inverter 713. The inverter 713 logically inverts the outputs of the AND-gate 711 and controls the one-shot pulse generator 750 with the inverted output.

The controller block 720 includes the micom 723, an OR-gate 722 and a flip-flop 721. The micom 723 receives the user's command to start searching the target dish and the start code from the start electrodes 407 to 409, and then, provides the ID code of the target dish to the latch 702, and a 2-bit logic signal to the driver block 730 for rotating the tray roulette 11 in a prescribed direction and to the OR-gate 722. The OR-gate 722 generates the drive signal by logically adding the 2-bit logic signal from the micom 723, wherein the 2-bit logic signal is made up of two signals, each signal from each of the two lines connecting the micom 723 and the OR-gate 722. The flip-flop 721 temporarily holds the output of the OR-gate 722 until the output of the AND gate 711 enables the flip-flop 721 and sends it to the multiplexer 760.

The driver block 730 includes a first and a second demultiplexer 731 and 732. The first de-multiplexer 731 helps drives the motor 440 to rotate in a direction when one among the drive signal and the PWM signal is supplied from the multiplexer 760. The second de-multiplexer 732 outputs a signal for use in halting the rotation of the motor 440 under the control of the micom 723 when the reverse-polarity one-shot pulse is supplied from the one-shot pulse generator 750.

The PWM signal provider block 740 includes a PWM signal generator 741 and an AND-gate 742. The PWM signal generator 741 generates the PWM signal which is used for reducing the rotation speed of the motor 440. The AND-gate 742 logically multiplies the outputs of the PWM signal generator 741 and the output of an AND-gate 711 and sends the result to the multiplexer 760.

Now, the operation of the rotation controller 420 will be described in detail by reference to FIG. 7 and FIG. 8.

Once the micom 723 receives an instruction of the user to reproduce a target dish, the micom 723, provides the ID code of the target dish to the latch 702 at time t1, and at the same time, outputs the 2-bit logic signal, e.g., 10 as shown in FIGS. 8A and 8B to the OR-gate 722 and the de-multiplexers 731, 732, wherein the 2-bit logic signal determines "drive or stop" and "clockwise or counterclockwise".

For example, when the 2-bit logic signal is 00 or 11, no drive and thus no direction. On the other hand, in case of 10, it is used to drive the motor clockwise but to give counterclockwise torque for stopping the motor, and in case of 01, it is used to drive the motor counterclockwise but to give clockwise torque for stopping the motor.

Then, the OR-gate 722 generates the drive signal shown in FIG. 8C by logically adding the set of logic signals shown in FIGS. 8A and 8B, outputs the result, i.e., 1, the drive signal, to the flip-flop 721, and then, the flip-flop 721 provides the drive signal to the multiplexer 760.

The AND-gate 711 in the stop controller block 710 provides a logic 0 signal to the multiplexer 760 since the end code is not yet provided to the AND-gate 711, and then the multiplexer 760 selects the drive signal shown in FIG. 8C from the flip-flop 721, wherein the logic 0 signal is used as a selection signal at the multiplexer 760. The multiplexer 760 provides the drive signal to the de-multiplexer 731 in response to the selection signal. The de-multiplexer 731 outputs the drive signal to the motor driver 430. The direction of the rotation of the motor is determined by the 2-bit logic signal provided by the micom 723. For example, if the 2-bit logic signal outputted from the micom 723 is 10 as shown in FIGS. 8A and 8B, the direction is the clockwise direction, and if the 2-bit logic signal is 01, it is used to make the motor revolve 720 in a counterclockwise direction.

As the tray roulette 11 rotates, the ID codes are generated. The ID codes generated by the contact of the electrodes are inputted to the comparator 701 via the ID code generators 401 to 403. The ID code of the target dish from the micom 723 held in the latch 702 is then provided to the comparator 701. The comparator 701 compares the ID code from the latch 702 with the ID code from the ID code generators 401 to 403, then outputs a logic 1 signal if the two compared signals are determined, e.g., at time t2, equal to each other as shown in FIG. 8D. The equality implies that the dish currently approaching the pickup position Y is the very target dish.

Subsequently, the logic 1 signal from the comparator 701 is fed to the flip-flop 712 at time t2 as shown in FIG. 8D. The flip-flop 712 generates signal as shown in FIG. 8E to provide it to the AND-gate 711, wherein the flip-flop does not change its output state without further input thereto. If the end code is generated at time t3 by the subsequent rotation of the tray roulette 11, the end code, logic 1, is inputted to the AND-gate 711. The end code is shown in FIG. 8F.

Therefore, the AND-gate 711 outputs logic 1 signal, also shown in FIG. 8F. The output of the AND-gate 711 is provided to the AND-gate 742 and also used as a selection control signal for the multiplexer 760. The outcome of the AND-gate 711 is provided to the flip-flops 712 and 721, the comparator 701, and provided to the one-shot pulse generator 750 after being logically inverted by the inverter 713.

As shown in FIG. 8F, the output of the AND-gate 711 maintains logic 1 only when the end code exists. The rising edge of the outcome of the AND-gate 711 shown in FIG. 8F is used as a clear signal for the comparator 701, which means that the comparator 701 outputs logic 0 after time t3. Although the output of the comparator 701 as shown in FIG. 8D is kept 1 while the result of the comparison is equal. The output of the AND-gate 711 is used, at time t3, as resetting the comparator 701 in order to ensure that the comparator 701 is reset before the next comparison is performed. On the other hand, the falling edge of the outcome of the AND-gate 711 at time t4 is used for a clear signal for the flip-flops 712, 721, which means that the flip-flops 712 and 721 output logic 0 after time t4, the falling edge is shown in FIG. 8C and 8E.

The AND-gate 742 logically multiplies the outputs of the AND-gate 711 shown in FIG. 8F and the PWM signal, shown in FIG. 8G generated by the PWM signal generator 741, and feeds the result shown in FIG. 8H to the multiplexer 760. The multiplexer 760 selectively outputs one out of the signal from the flip-flop 721 shown in FIG. 8C and output of the signal from the AND-gate 742 shown in FIG. 8H, that is, the multiplexer 760 outputs the signal from the flip-flop 721 when the output of the AND-gate 711 is logic 0, while outputs the signal from the AND-gate 742 when the output of the AND-gate 711 is logic 1 as shown in FIG. 8K.

In other words, the multiplexer 760 provides the drive signal to the first de-multiplexer 731 once the target dish is determined, and then provides the PWM signal to the first demultiplexer 731 in response to the end code generated after sensing the movement of the target dish toward the pickup position Y.

The de-multiplexer 731 provides signal for use in driving to a motor driver 430 in response to the drive signal, and reduces the rotation speed of the motor 440 by using the PWM signal.

The one-shot pulse generator 750 generates the one-shot pulse shown in FIG. 8J at the rising edge, at time t4, of the control signal provided by the inverter 713 shown in FIG. 8I.

At the rising edge of the output signal of the inverter 713, the one-shot pulse generator 750 provides a reverse-polarity one-shot pulse to the micom 723 and the demultiplexer 732. On the contrary to the case when driving the motor, if a 2-bit logic signal from the micom 723 is 10, the direction of the torque of the motor is counterclockwise; and if a 2-bit logic signal from the micom 723 is 01, the direction of the torque of the motor is clockwise. In response to the falling edge of the reverse polarity one-shot pulse, the micom 723 ends outputting the code of the target dish and the 2-bit logic signal.

The de-multiplexer 732 provides a logic signal to be used to generate a torque of the motor 440 in the reverse direction of current rotation to the motor driver 430, thereby halts the rotation of the motor 440.

Thus, the tray roulette controller in accordance with the present invention controls the rotation of the tray roulette 11 by using the ID codes of each dish generated during the contact of the electrodes, and by using logic devices such as multiplexers, de-multiplexers, AND-gates, OR-gates and flip-flops instead of using a software-oriented control by the micom 21. Further, the volume of the time-taking software process in the micom 723 can be immensely reduced compared to that of the conventional micom 21. Therefore, a tray roulette control time in accordance with the present invention is much less than that of the conventional controller.

While the present invention has been described with respect to the preferred embodiments, other modifications and variations may be made without departing from the scope and spirit of the present invention as set forth in the following claims.

What is claimed is:

1. A method for controlling a rotation of a tray roulette for use in a disk changer, the tray roulette having a plurality of dishes and each dish cradling a disk, the method comprising the steps of:
    (a) receiving a user's instructions to search for a target dish out of the plurality of dishes in the tray roulette;
    (b) rotating the tray roulette in response to the user's instructions;
    (c) producing a plurality of ID codes for identifying the plurality of dishes, a start code and an end code while a scanner electrode contacts ID electrodes, start electrodes and end electrodes linked to the tray roulette as the tray roulette rotates; and
    (d) controlling the rotation of the tray roulette by using the ID codes, the start code and the end code.

2. An apparatus for controlling a tray roulette, the tray roulette having a plurality of dishes, each dish cradling a disk, for use in a disk changer, wherein the apparatus generates a plurality of ID codes for identifying the dishes, respectively, and a start code and an end code for use in searching a target dish, the apparatus comprising:
    control means for outputting the ID code assigned to the target dish and generating a drive signal for use in determining the rotation and direction of the tray roulette once the target dish is determined;
    comparing means for comparing the ID codes generated during the rotation of the tray roulette with the ID code of the target dish provided by the control means;
    stop control means for generating a selection signal for use in selecting one out of the drive signal, a PWM signal and a reverse-polarity one-shot pulse;

PWM means for providing the PWM signal for use in reducing the rotation speed of the tray roulette when the target dish reaches a prescribed position;

one-shot pulse generating means for providing the reverse-polarity one-shot pulse for use in stopping the tray roulette when the target dish reaches a pickup position;

a multiplexer for selectively outputting either the drive signal or the PWM signal in response to the selection signal; and driving means for driving and stopping a motor in response to the output of the one-shot pulse generating means and the output of the multiplexer.

3. The apparatus of claim 2, wherein the control means includes;

a micom for providing the ID code of the target dish to the comparing means and the 2-bit logic signal to the driving means;

an OR-gate for generating the drive signal by logically adding the 2-bit logic signal from the micom; and a flip-flop for holding the output of the OR-gate to the multiplexer until a signal is inputted thereto and send the holding data to the multiplexer.

4. The apparatus of claim 2, wherein the comparing means includes:

a latch for holding and sending the ID code of the target dish provided by the control means to a comparator; and a comparator for outputting a match signal when the ID codes generated during the rotation of the tray roulette is identical to the ID code of the target dish provided by the latch.

5. The apparatus of claim 2, wherein the PWM means includes:

a PWM signal generator for generating the PWM signal; and an AND-gate for logically multiplying the outputs of the PWM signal generator and the output of the stop control means, and sending the outcome to the multiplexer.

6. The apparatus of claim 2, wherein the driving means includes:

a first de-multiplexer for driving the motor in the determined direction when either the drive signal or the PWM signal is supplied from the multiplexer; and a second de-multiplexer for stopping the rotation of the motor when the reverse-polarity one-shot pulse is supplied from the one-shot pulse generating means.

7. The apparatus of claim 2, wherein the stop control means includes:

a flip-flop for holding and sending the output of the comparing means;

an AND-gate for logically multiplying the output of the flip-flop and the end code generated while the tray roulette rotates for use in controlling the PWM means and the multiplexer; and an inverter for logically inverting the output of the AND-gate for use in controlling the one-shot pulse generating means.

8. A disk changer system comprising:

a tray roulette having N number of dishes, each dish cradling a disk, N being a positive integer;

a base for supporting the tray roulette;

N number of ID electrodes, start electrodes and end electrodes, respectively, attached to the base;

a scanner electrode attached to the tray roulette;

N number of code generators for generating ID codes for identifying a plurality of dishes in the tray roulette, a start code and an end code;

rotation control means for controlling the rotation of the tray roulette by using the ID codes, the start code and the end code;

a motor for driving the tray roulette, the motor being associated with the tray roulette by using a spindle; and motor driving means for providing electrical power to the motor under the control of the rotation controller;

wherein the scanner electrode contacts the ID electrodes, the start electrodes and the end electrodes as the tray roulette rotates around the spindle, and generates the ID codes, the start code and the end code, these codes being inputted to the rotation controller for use in rotating, reducing the speed thereof, and stopping the motor.

* * * * *